United States Patent Office 3,402,039
Patented Sept. 17, 1968

3,402,039
PIPERAZINIUM SALTS AS PLANT STUNTING AGENTS
Dorsey R. Mussell, Midland, and Elton K. Morris, Clare, Mich., assignors to The Dow Chemical Company, Midland, Mich., a corporation of Delaware
No Drawing. Filed Dec. 5, 1966, Ser. No. 598,914
6 Claims. (Cl. 71—76)

ABSTRACT OF THE DISCLOSURE

Method of retarding plant growth by the application of a 1-methyl-1-(substituted)-4-(polychlorophenyl)-piperazinium salt compound corresponding to at least one of the formulae

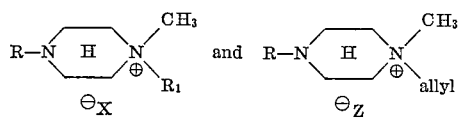

to the plant or its habitat. In the above formulas, R represents pentachlorophenyl or 2,4,5-trichlorophenyl, $R_1$ represents methyl, 2-fluoroethyl, cyanomethyl, ethyl, octadecyl or hydroxyethyl, X represents chloride, iodide, bromide, dichloroiodate, bromochloroiodate, tetrachloroiodate, sulfate, nitrate, formate, acetate, propionate or butyrate, and Z represents chloride, iodide, bromide, sulfate, nitrate, formate, acetate, propionate or butyrate.

---

In recent years, the use of chemical materials for the control of the growth of vegetation has found widespread acceptance among agriculturists. Such control may be so far reaching as to cause death of the plants. Moreover, even where growth control has been achieved without resulting death of the plants, many of the chemical compounds so employed have caused substantial thickening or deformation of the stems of plants so treated. It is readily apparent that it would be desirable to have a chemical growth retardant which will inhibit the growth of plants without causing substantial thickening or deformation of the stems. This is particularly desirable when flowering plants such as marigolds are to be treated.

It is an object of the present invention to provide a new method for modifying and altering the growth characteristics of plants. More particularly, it is an object of the present invention to provide a method for dwarfing or decreasing the size of plants without causing deformation or substantial thickening of the stems.

According to the present invention, it has been discovered that the growth characteristics of plants can be modified and altered by exposing plants and plant parts to the action of a growth-retarding amount of at least one member of the group of polychlorophenyl piperazine compounds corresponding to the formulas

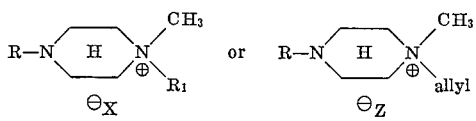

wherein R represents pentachlorophenyl or 2,4,5-trichlorophenyl, $R_1$ represents methyl, 2-fluoroethyl, cyanomethyl, octadecyl, ethyl or hydroxyethyl, X represents chloride, bromide, iodide, dichloroiodate, bromochloriodate, tetrachloroiodate, sulfate, nitrate, formate, acetate, propionate and butyrate, and Z represents bromide, chloride, iodide, sulfate, nitrate, formate, acetate, propionate or butyrate. The compounds corresponding to the formula

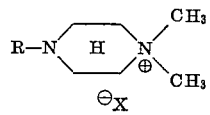

are preferred embodiments in the method of the present invention.

The compounds are crystalline solid materials which are of moderate solubility in water and somewhat soluble in common organic solvents such as methanol or ethanol. By virtue of such properties, the (polychlorophenyl) substituted piperazine compounds of the present invention are readily incorporated in conventional liquid adjuvants. Such compositions are economically stored or transported. In turn, the ultimate user can employ the liquid compositions with or without dilution, to alter or modify the growth characteristics of plants.

The exposure of plants or plant parts to the action of a growth-retarding amount of the active compound is essential and critical for the practice of the present invention. The exact dosage to be employed depends upon the response desired in the plant as well as other factors, such as the plant species, and the stage of growth thereof, the soil type and depth at which the compounds are distributed in the soil.

The method of the present invention can be carried out by distributing the unmodified compounds in growth media or upon the surfaces of the above ground portions of the plants. The present method also embraces the employment of a liquid, dust or wettable powder composition containing the growth-retarding compound or combinations of the various growth-retarding compounds. In such usages, the growth-retarding compounds may be modified with one or a plurality of additaments or suitable adjuvants including water, or other liquid carriers, surface-active dispersing agents and finely divided solids. Depending upon the concentration of the growth-retarding compound, such augmented compositions are adapted to be distributed in the soil or upon the above ground surfaces of plants or to be employed as concentrates and subsequently diluted with an additional inert carrier to produce the ultimate treating composition. In compositions where the adjuvant or helper is a finely divided solid, a surface-active agent or a liquid additament, the adjuvant cooperates with the active component so as to facilitate the invention and obtain the improved and outstanding results.

The exact concentration of the (polychlorophenyl)-piperazine compound to be employed in the treating composition is not critical and may vary considerably provided a growth-retarding amount of the active compound is applied to the plant foliage or to the plant growth media. The concentration of the active compound to be employed in liquid compositions which are applied to the above-ground portions of the plants is from 100 to 3,000 or more parts per million by weight of the treating composition. When the growth-retarding compound is to be applied to the growth media, it is applied in an amount sufficient to provide the compound at a concentration of at least 10 parts per million by weight and preferably at a concentration of 20 to 50 parts per million by weight of the growth media. In dusts, the growth-retarding compound is usually employed at a concentration of from about 0.5 to 10 percent by weight and usually not in excess of about 20 percent. In both liquid and dust compositions to be employed as concentrates, the active compounds can be present in a concentration of about from 5 to 80 percent by weight.

Liquid compositions containing the desired amount of the active ingredient can be prepared by dispersing the growth retarders or wettable powder concentrates thereof in water or in organic liquids, with or without the aid of suitable surface-active agents or dispersing agents such as ionic or non-ionic emulsifying agents. Suitable organic liquid carriers include the agricultural spray oils, or water-acetone mixtures and the like. In the liquid compositions the choice of dispersing and emulsifying agents and the amount thereof is dictated by the nature of the composition and by the ability of the agent to facilitate the dispersion of the growth retarding compounds in the carrier to produce a desired composition or to facilitate the wetting of surfaces upon which the compositions are applied. Dispersing and emulsifying agents which can be employed in the compositions include the condensation products of alkylene oxides with phenols and organic acids, alkyl aryl sulfonates, polyoxyalkylene derivatives of sorbitan esters, complex ether alcohols, mahogany soaps and the like.

In the preparation of dust or wettable powder compositions, the active ingredient is dispersed in and on a finely divided solid such as clay, talc, chalk, gypsum and the like. In such operations, the finely divided carrier may be mechanically mixed or ground with the (polychlorophenyl)piperazine compound. Similarly, dust compositions containing the growth retarding compound can be prepared from various of the solid surface-active dispersing agents such as bentonite, fuller's earth, attapulgite and other clays. Depending upon the proportions of the ingredients, these dust compositions can be employed as concentrates and subsequently diluted with additional solid surface-active dispersing agents, or with chalk, talc, gypsum and the like to obtain a desired amount of active ingredient in a composition adapted to be employed for the modification of the growth of plants. Dust compositions containing a dispersing agent can be employed as a wettable powder composition and dispersed in water to form spray mixtures.

When operating in accordance with the present invention, growth-retarding amounts of the (polychlorophenyl)piperazine compounds can be supplied by the application of liquid and dust compositions to the surface of the soil or to the above ground surfaces of plants by such conventional methods as power dusters, boom and hand sprayers, and spray dusters, and the like.

In a further method, the distribution of the (polychlorophenyl)piperazine compound in soil can be accomplished by introducing the growth-retarding compounds in the water employed to irrigate the soil. In such procedures, the amount of water can be varied with the porosity and water-holding capacity of the soil to obtain the desired depth of distribution of the growth-retarding material.

Example 1

A soil plot containing sandy loam soil is seeded to corn. Thereafter, the soil plot is treated with an aqueous acetone composition containing 1,1-dmethyl-4-(pentachlorophenyl)piperazinium chloride at a concentration of 500 parts per million by weight of ultimate mixture. This aqueous acetone composition is added to one half of the seeded soil plot in an amount sufficient to provide 1,1-dimethyl-4-(pentachlorophenyl)piperazinium chloride in an amount equivalent to 20 pounds per acre. The half of the plot not treated with the growth-retarding compound is treated with an equal amount of an aqueous acetone composition which does not contain the growth regulant. Following the treatment of the seeded soil plot, the growth of the plants is observed for 3 weeks. At the end of the observation period it is determined that the corn plants in the half of the field treated with 1,1-dimethyl-4-(pentachlorophenyl)piperazinium chloride are only 50 percent as tall as the plants in the untreated portion of the soil plot. At the end of the growing season the plants growing in the treated soil are still only 50 percent of the size of the plants growing in the untreated soil. Furthermore, the stems of the plants grown in the treated soil are not substantially thicker than the stems of the untreated check plants.

Example 2

In a similar operation, carried out in exactly the same manner as in Example 1, 1,1-dimethyl-4-(pentachlorophenyl)piperazinium chloride is applied to soil plots containing pinto beans and marigold seeds at a concentration of 20 pounds per acre. As a result of such operations, after 4 weeks it is observed that the plants grown in the treated soil are only 50 percent as tall as plants grown in the untreated check soil and no substantial thickening of the stems is observed.

Example 3

Bean plants are sprayed to runoff with an aqueous composition containing 1,1-dimethyl-4-(pentachlorophenyl)piperazinium dichloroiodate at a concentration of 1,000 parts by weight per million parts by weight of composition. Untreated checks are sprayed with an aqueous solution which does not contain any of the growth retarding material. The treated and untreated bean plants are observed for 2 weeks whereupon it is ascertained that treated plants are only 25 percent of the size of the untreated check plants. Furthermore, there is observed no substantial thickening of the stems in the treated plants.

Example 4

The following table sets forth the compound employed, the concentration thereof in parts per million (p.p.m.) and the percent reduction in size that was obtained when various 1-methyl-1-(substituted)-4-(polychlorophenyl) piperazine compounds were employed exactly as described in Example 3.

| Compound Employed | Concentration, p.p.m. | Percent Retardation of Treated Plants as Compared to Untreated Controls |
|---|---|---|
| 1-methyl-1-octadecyl-4-(pentachlorophenyl)piperazinium chloride | 500 | 48 |
| 1-methyl-1-cyanomethyl-4-(pentachlorophenyl)piperazinium chloride | 1,000 | 52 |
| 1,1-dimethyl-4-(pentachlorophenyl)piperazinium chloride | 1,000 | 62 |
| 1,1-dimethyl-4-(2,4,5-trichlorophenyl)piperazinium chloride | 1,000 | 73 |
| 1-methyl-1-(2-fluoroethyl)-4-(pentachlorophenyl)piperazinium chloride | 1,000 | 56 |
| 1-methyl-1-allyl-4-(pentachlorophenyl)piperazinium chloride | 1,000 | 48 |
| 1-methyl-1-ethyl-4-(pentachlorophenyl)piperazinium chloride | 1,000 | 50 |
| 1,1-dimethyl-4-(pentachlorophenyl)piperazinium dichloroiodate | 500 | 61 |
| 1,1-dimethyl-4-(pentachlorophenyl)piperazinium bromochloroiodate | 1,000 | 42 |
| 1,1-dimethyl-4-(pentachlorophenyl)piperazinium tetrachloroiodate | 1,000 | 62 |

Example 5

In still further procedures, bean plants, treated as set forth in Example 3, with aqueous compositions containing one of the following (polychlorophenyl)piperazines as the sole growth regulating component at a concentration of 2,000 parts per million by weight are found to be about 50 percent the size of the untreated controls:

1,1-dimethyl-4-(pentachlorophenyl)piperazinium acetate,
1,1-dimethyl-4-(pentachlorophenyl)piperazinium sulfate,
1,1-dimethyl-4-(pentachlorophenyl)piperazinium bromide,
1,1-dimethyl-4-(pentachlorophenyl)piperazinium nitrate,
1-methyl-1-cyanomethyl-4-(pentachlorophenyl) acetate,
1-methyl-1-cyanomethyl-4-(pentachlorophenyl)piperazinium nitrate,
1-methyl-1-hydroxyethyl-4-(pentachlorophenyl)piperazinium sulfate, 1-methyl-1-hydroxyethyl-4-(pentachlorophenyl)piperazinium bromide,
1-methyl-1-hydroxyethyl-4-(pentachlorophenyl)piperazinium dichloroiodate,
1-methyl-1-ethyl-4-(pentachlorophenyl)piperazinium bromide,
1-methyl-1-ethyl-4-(pentachlorophenyl)piperazinium acetate,
1-methyl-1-ethyl-4-(pentachlorophenyl)piperazinium sulfate,
1-methyl-1-(2-fluoroethyl)-4-(pentachlorophenyl)-piperazinium acetate,
1-methyl-1-(2-fluoroethyl)-4-(pentachlorophenyl)piperazinium sulfate,
1-methyl-1-(2-fluoroethyl)-4-(pentachlorophenyl)piperazinium bromochloroiodate,
1-methyl-1-(2-fluoroethyl)-4-(pentachlorophenyl)piperazinium nitrate,
1-methyl-1-octadecyl-4-(pentachlorophenyl)piperazinium bromide,
1-methyl-1-octadecyl-4-(pentachlorophenyl)piperazinium acetate,
1-methyl-1-octadecyl-4-(pentachlorophenyl)piperazinium tetrachloroiodate,
1-methyl-1-allyl-4-(pentachlorophenyl)piperazinium acetate,
1-methyl-1-allyl-4-(pentachlorophenyl)piperazinium nitrate,
1-methyl-1-allyl-4-(pentachlorophenyl)piperazinium sulfate,
1,1-dimethyl-4-(2,4,5-trichlorophenyl)piperazinium bromide,
1,1-dimethyl-4-(2,4,5-trichlorophenyl)piperazinium sulfate,
1,1-dimethyl-4-(pentachlorophenyl)piperazinium butyrate,
1,1-dimethyl-4-(2,4,5-trichlorophenyl)piperazinium propionate,
1-methyl-1-cyanomethyl-4-(pentachlorophenyl)piperazinium formate,
1,1-dimethyl-4-(2,4,5-trichlorophenyl)piperazinium acetate,
1,1-dimethyl-4-(2,4,5-trichlorophenyl)piperazinium dichloroiodate,
1,1-dimethyl-4-(2,4,5-trichlorophenyl)piperazinium tetrachloroiodate,
1,1-dimethyl-4-(2,4,5-trichlorophenyl)piperazinium bromochloroiodate,
1-methyl-1-cyanomethyl-4-(2,4,5-trichlorophenyl)piperazinium tetrachloroiodate,
1-methyl-1-octadecyl-4-(2,4,5-trichlorophenyl)piperazinium bromide,
1-methyl-1-hydroxyethyl-4-(2,4,5-trichlorophenyl)piperazinium acetate,
1-methyl-1-ethyl-4-(2,4,5-trichlorophenyl)piperazinium bromochloroiodate,
1-methyl-1-ethyl-4-(2,4,5-trichlorophenyl)piperazinium acetate,
1-methyl-1-allyl-4-(2,4,5-trichlorophenyl)piperazinium acetate,
1-methyl-1-(2-fluoroethyl)-4-(2,4,5-trichlorophenyl) piperazinium chloride,
1-methyl-1-(2-fluoroethyl)-4-(2,4,5-trichlorophenyl)piperazinium bromide,
and 1-methyl-1-(2-fluoroethyl)-4-(2,4,5-trichlorophenyl) piperazinium sulfate.

The 1-methyl-1-(substituted)-4-(pentachlorophenyl)piperazine growth-retarding compounds of the present invention are prepared in accordance with the methods described in a co-pending application, Ser. No. 598,893 filed even date herewith. The 1-methyl-1-(substituted)-4-(2,4,5-trichlorophenyl)piperazine compounds of the present invention are prepared in methods analogous to the methods employed in the aforesaid copending application. In such analogous methods, 1-methyl-4-(2,4,5-trichlorophenyl)piperazine is employed as a starting material in the place of and in the same manner as the 1-methyl-4-(pentachlorophenyl)piperazine.

The 1-methyl-4-(2,4,5-trichlorophenyl)piperazine to be so employed is prepared by reacting 1-(2,4,5-trichlorophenyl)piperazine with formic acid, formaldehyde and calcium chloride in water as the reaction medium. The reaction mixture is heated for several hours at about 80° C. Following the heating period the reaction mixture is cooled and thereafter diluted with concentrated ammonium hydroxide. During the dilution an oil precipitates. This oil is extracted with benzene. The 1-methyl-(2,4,5-trichlorophenyl)piperazine product is thereafter separated from the benzene solution by evaporating the benzene to obtain the product as a residue. The substituted piperazine may be converted to the hydrochloride salt form by reaction with aqueous hydrochloric acid and evaporation to dryness.

In a representative procedure, 1-(2,4,5-trichlorophenyl) piperazine hydrochloride (50 grams; 0.15 mole) was dissolved in 500 milliliters of water and the resulting solution treated with excess ammonium hydroxide. During the contacting of the reactants a solid material precipitated and was collected by filtration, washed with water and suspended in 500 milliliters of water.

Formic acid was added to the aqueous mixture in an amount sufficient to bring all of the solid material into solution. Thereafter, 37 percent aqueous formaldehyde (25 grams; 0.3 mole) and calcium chloride (2 grams) were added to the solution and the resulting solution heated on the steam bath at 80° C. for about 15 hours. Following the heating period the reaction mixture was cooled to 25° C. Thereafter, excess concentrated ammonium hydroxide was added and the tan oil which formed during the addition of the ammonium hydroxide was extracted with benzene. The benzene extract was washed 5 times in succession with water and dried over sodium sulfate. Methyl iodide (42 grams; 0.3 mole) was added with stirring to the dried benzene solution. Upon contacting the reactants a precipitate began to form. The reaction mixture was allowed to stand at room temperature for 3 days. During the three day priod a solid material precipitated in the reaction mixture. Thereafter, the solid precipitate was separated by filtration, washed with benzene and air dried. This dried material was dissolved in 1500 milliliters of methanol and silver chloride (74 grams) added to the methanol solution. Following the addition of the silver chloride the reaction mixture was heated at the boiling temperature for 15 minutes. Upon completion of the heating period the silver iodide byproduct was removed by filtration and the filtered methanol solution subjected to evaporation to remove the methanol and obtain the 1,1-dimethyl-4-(2,4,5-trichlorophenyl)piperazinium chloride as a crystalline solid which was recrystallized from benzene-methanol, and dried overnight in vacuo at 60° C. This dried product was found to melt at 262°–263° C.

1-(2,4,5-trichlorophenyl)piperazine is prepared by heating 1,2,4,5-tetrachlorobenzene with an excess of piperazine and separating the resulting product from byproducts.

We claim:
1. The method for retarding the growth of plants which comprises treating plants or plant parts or their habitats with a growth retarding amount of a 1-methyl-1-substituted-4-(polychlorophenyl)piperazinium salt compound corresponding to at least one of the formulas

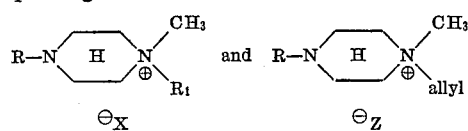

wherein R represents pentachlorophenyl or 2,4,5-trichlorophenyl, $R_1$ represents methyl, 2-fluoroethyl, cyanomethyl, ethyl, octadecyl or hydroxyethyl, X represents chloride, bromide, iodide, dichloroiodate, bromochloroiodate, tetrachloroiodate, sulfate, nitrate, formate, acetate, propionate, or butyrate, and Z represents chloride, bromide, iodide, sulfate, nitrate, formate, acetate, propionate or butyrate.

2. The method claimed in claim 1 wherein the compound employed is a 1,1-dimethyl-4-(polychlorophenyl) piperazinium salt compound.

3. The method claimed in claim 1 wherein the compound employed is 1,1-dimethyl-4-(pentachlorophenyl) piperazinium chloride.

4. The method claimed in claim 1 wherein the compound employed is 1,1-dimethyl-4-(2,4,5-trichlorophenyl) piperazinium chloride.

5. The method claimed in claim 1 wherein the compound employed is 1,1-dimethyl-4-(pentachlorophenyl) piperazinium dichloroiodate.

6. The method claimed in claim 1 wherein the compound employed is 1,1-dimethyl-4-(pentachlorophenyl) piperazinium tetrachloroiodate.

References Cited

UNITED STATES PATENTS

| 2,823,987 | 2/1958 | Fielden et al. | 71—92 |
| 2,830,056 | 4/1958 | Ruschig et al. | 260—268 |
| 3,133,064 | 5/1964 | Kealy | 71—76 |
| 3,156,555 | 11/1964 | Tolbert | 71—76 |
| 3,255,194 | 6/1966 | Dill | 71—92 |

LEWIS GOTTS, *Primary Examiner.*

G. H. HOLLRAH, *Assistant Examiner.*